(12) United States Patent
Yang et al.

(10) Patent No.: US 9,392,184 B2
(45) Date of Patent: *Jul. 12, 2016

(54) ELECTRONIC APPARATUS AND ADJUSTMENT METHOD THEREOF

(71) Applicant: HTC Corporation, Taoyuan, Taoyuan County (TW)

(72) Inventors: Hung-Chih Yang, Taoyuan (TW); Wei-Chih Liu, Taoyuan (TW); Chung-Hsien Hsieh, Taoyuan (TW); Yu-Chun Peng, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,255

(22) Filed: Jun. 26, 2015

(65) Prior Publication Data

US 2015/0296114 A1 Oct. 15, 2015

Related U.S. Application Data (62) Division of application No. 13/771,311, filed on Feb. 20, 2013, now Pat. No. 9,137,451.

(60) Provisional application No. 61/608,804, filed on Mar. 9, 2012.

(51) Int. Cl.
*H04N 5/235* (2006.01)

(52) U.S. Cl.
CPC .............. *H04N 5/2353* (2013.01); *H04N 5/235* (2013.01); *H04N 5/2351* (2013.01); *H04N 5/2355* (2013.01)

(58) Field of Classification Search
None
See application file for complete search history.

(56) References Cited

U.S. PATENT DOCUMENTS

| | | | |
|---|---|---|---|
| 9,137,451 B2 * | 9/2015 | Yang | .................... H04N 5/2353 |
| 2011/0096192 A1 | 4/2011 | Niikura | |

FOREIGN PATENT DOCUMENTS

CN 102053453 A 5/2011

OTHER PUBLICATIONS

Office Action issued in corresponding China application on Sep. 25, 2015 (and its English translation).

\* cited by examiner

*Primary Examiner* — Twyler Haskins
*Assistant Examiner* — Angel L Garces-Rivera
(74) *Attorney, Agent, or Firm* — McClure, Qualey & Rodack, LLP (57) ABSTRACT

Electronic apparatuses and adjustment methods thereof are provided. The electronic apparatus includes a camera module and a processor. The camera module is enabled into an HDR mode and captures a reference frame according to a first exposure setting, wherein the reference frame corresponds to a plurality of luminance values. The processor calculates a weighted luminance value of the reference frame according to the luminance values, generates a comparison result by comparing the weighted luminance value and a luminance target of the HDR mode, and decides a second exposure setting according to the comparison result.

8 Claims, 4 Drawing Sheets

ELECTRONIC APPARATUS AND ADJUSTMENT METHOD THEREOF

CROSS-REFERENCES TO RELATED APPLICATIONS

This application is a divisional of U.S. application Ser. No. 13/771,311 filed on Feb. 20, 2015, which claims the benefit from the priority of U.S. Provisional Application Ser. No. 61/608,804 filed on Mar. 9, 2012, the disclosures of which are incorporated by reference herein in their entirety.

BACKGROUND OF THE INVENTION

1. Field of the Invention

The present invention relates to electronic apparatuses and adjustment methods thereof; more particularly, the present invention relates to electronic apparatuses and adjustment methods thereof that perform adjustments based on luminance values of a reference frame.

2. Descriptions of the Related Art

The techniques for generating High Dynamic Range (HDR) frames have been investigated in recent years, which allow a frame to have a greater dynamic range between the lightest and darkest areas of the frame.

Conventional HDR techniques capture several frames (e.g. three frames) by different exposure settings and then generate an HDR frame based on these frames. These conventional HDR techniques have drawbacks because environment conditions have not been considered. Specifically, when a scene to be captured is in the condition of strong backlight, a preview frame would get worse due to the subject getting dark. In this situation, even an exposure setting of +1 EV, 0 EV, and −1 EV (or +2 EV, 0 EV, and −2 EV) cannot result in a good HDR frame.

Consequently, the techniques for considering environment conditions in order to generate pleasant frames, such as HDR frames, are still in an urgent need.

SUMMARY OF THE INVENTION

To solve the aforementioned problems, the present invention provides an electronic apparatus comprising a camera module and a processor. The camera module and the processor electrically connected to each other. When the camera module is enabled into a High Dynamic Range (HDR) mode, the camera module captures a reference frame according to an exposure setting. The reference frame corresponds to a plurality of luminance values. The processor calculates a weighted luminance value of the reference frame according to the luminance values, generates a comparison result by comparing the weighted luminance value and a luminance target of the HDR mode, and decides another exposure setting according to the comparison result.

To solve the aforementioned problems, the present invention provides another electronic apparatus comprising an input interface and a processor. The input interface receives a reference frame, wherein the reference frame corresponds to a plurality of luminance values. The processor adjusts at least a portion of the luminance values that are greater than a predetermined threshold, calculates a weighted luminance value of the reference frame according to the luminance values, generates a comparison result by comparing the weighted luminance value and a luminance target, and decides the luminance values according to the comparison result.

To solve the aforementioned problems, the present invention provides an adjustment method for use in an electronic apparatus. The electronic apparatus comprises a processor and a camera module. The adjustment method comprises the following steps of: (a) detecting that an HDR mode of the camera module has been enabled by the processor, (b) capturing a reference frame according to an exposure setting by the camera module, wherein the reference frame corresponds to a plurality of luminance values, (c) calculating a weighted luminance value of the reference frame according to the luminance values by the processor, (d) generating a comparison result by comparing the weighted luminance value and a luminance target of the HDR mode by the processor, and (e) deciding the exposure setting according to the comparison result by the processor.

To solve the aforementioned problems, the present invention provides another adjustment method for use in an electronic apparatus. The electronic apparatus comprises a processor and an input interface. The adjustment method comprises the following steps of: (a) receiving a reference frame by the input interface, the reference frame corresponding to a plurality of luminance values, (b) adjusting at least a portion of the luminance values that are greater than a predetermined threshold by the processor, (c) calculating a weighted luminance value of the reference frame according to the luminance values by the processor after the adjusting step, (d) generating a comparison result by comparing the weighted luminance value and a luminance target by the processor, and (e) deciding the luminance values according to the comparison result by the processor.

The techniques disclosed by the present invention will adjust the exposure setting of a camera module in order to meet a luminance target when the HDR mode of the camera module is enabled. In order to derive a better exposure setting, at least a portion of the luminance values of a reference frame that are greater than a predetermined threshold may be adjusted. Hence, the frames captured according to the adjusted exposure setting and a subsequent HDR frame will contain more details. In addition, in case there is a need for a frame that is of low luminance variance, the techniques disclosed by the present invention are able to achieve that as well.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for the purpose of illustration rather than to limit the present invention. It should be appreciated that, in the following embodiments and the attached drawings, elements unrelated to the present invention are omitted from the depiction.

Figure 1:
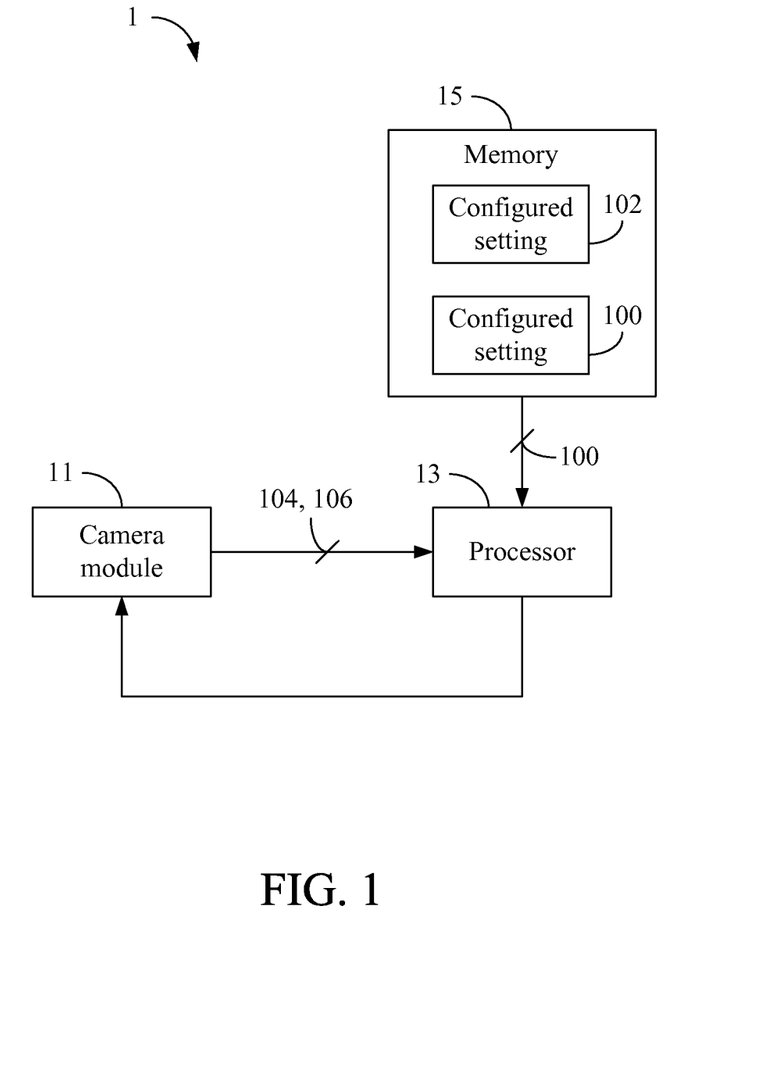
FIG. 1 illustrates a schematic view of an electronic apparatus 1 of the first and second embodiments of the present invention.

A first embodiment of the present invention is an electronic apparatus 1 and a schematic view of which is depicted in FIG. 1. The electronic apparatus 1 comprises a camera module 11, a processor 13, and a memory 15, wherein the processor 13 is electrically connected to the camera module 11 and the memory 15. The processor 13 may be any of various processors, central processing units (CPUs), microprocessors, or other computing devices that are well-known by those of ordinary skill in the art. The memory 15 may be any one of various built-in memories or other storage media that have the same function and can readily occur to those of ordinary skill in the art.

The camera module 11 has two modes—automatic mode and High Dynamic Range (HDR) mode. The memory 15 is stored with a configured setting 100 for the HDR mode and a configured setting 102 for the automatic mode. The configured setting 102 for the automatic mode includes a luminance target of the automatic mode, while the configured setting 100 for the HDR mode includes a luminance target of the HDR mode. When either the automatic mode or HDR mode is enabled, the camera module 11 captures a reference frame by an exposure setting (e.g. a default one, a random one, or else) and the luminance value of the reference frame (e.g. the average luminance value of the reference frame) is aimed at the luminance target of that mode. If the luminance target is not met, the exposure setting will be adjusted by the electronic apparatus 1. Specifically, the exposure setting includes an exposure time and/or a gain value, so the exposure time and/or the gain value of that exposure setting will be adjusted when the luminance target is not met.

When the HDR mode of the camera module 11 is enabled, a scene to be captured is usually in the condition of strong backlight and may cause a high-contrast frame. Having a higher luminance target will result in a higher exposure setting (i.e. longer exposure time and/or greater gain value) and make the subsequent captured frames as well as a resultant HDR frame contain more details. Hence, the luminance target of the HDR mode is higher than the luminance target of the automatic mode in this embodiment. The following descriptions will be focused on the situation when the HDR mode of camera module 11 is enabled.

When the camera module 11 is enabled into the HDR mode, the processor 13 retrieves the configured setting 100 from the memory 15. Next, the camera module 11 captures a reference frame 104 according to a first exposure setting. The reference frame 104 corresponds to a plurality of luminance values. In this embodiment, the luminance values corresponding to the reference frame 104 can be derived according to two alternative ways. According to the first way, the processor 13 divides the reference frame 104 into a plurality of blocks and calculates an average luminance value for each of the blocks, wherein each of the average luminance value is one of the aforementioned luminance values corresponding to the reference frame 104. According to the second way, the reference frame 104 has a plurality of pixels, each of the pixels has a pixel value, and each of the pixel values is one of the aforementioned luminance values corresponding to the reference frame 104.

The processor 13 then calculates a weighted luminance value of the reference frame 104 according to the luminance values corresponding to the reference frame 104. Specifically, if the luminance values are the average luminance values of the blocks according to the above first way, the processor 13 calculates the weighted luminance value according to the average luminance values of the blocks, such as averaging the average luminance values of the blocks. Alternatively, if the luminance values are the pixel values of the reference frame 104, the processor 13 calculates the weighted luminance value according to the pixel values, such as averaging the pixel values.

Afterwards, processor 13 generates a comparison result by comparing the weighted luminance value and the luminance target of the HDR mode and decides a second exposure setting according to the comparison result. Particularly, when the comparison result is the weighted luminance value being equal to the luminance target, the processor 13 decides the second exposure setting to be equal to the first exposure setting. It means that the exposure time and/or gain value of the first exposure setting is adequate and no further adjustment is required.

When the comparison result is the weighted luminance value being greater than the luminance target, the processor 13 decides that the second exposure setting should be smaller than the first exposure setting (i.e. the second exposure setting should have a shorter exposure time and/or a smaller gain value). When the comparison result is the weighted luminance value being smaller than the luminance target, the processor 13 decides that the second exposure setting should be greater than the first exposure setting (i.e. the second exposure setting should have a longer exposure time and/or a greater gain value). Afterwards, the camera module 11 captures another frame 106 according to the second exposure setting. For these two situations, the camera module 11 and the processor 13 repeat the aforementioned processes until the weighted luminance value is equal to the luminance target of the HDR mode.

According to the above descriptions, the processor 13 of the electronic apparatus 1 will determine whether the luminance target of the HDR mode has been met when the HDR mode of the camera module 11 is enabled. If it is not, the processor 13 will decide the second exposure setting and capture another frame according to the second exposure setting. The processes will be repeated until the luminance target of the HDR mode has been achieved. Afterwards, the camera module 11 will use the exposure setting that meets the luminance target as well as a positive exposure setting and a negative exposure setting thereof to capture frames and generate an HDR frame accordingly. Since the exposure settings have been adjusted, the frames as well as the subsequent HDR frame contain more details.

Please also refer to FIG. 1 for a second embodiment of the present invention. The operations executed by the electronic apparatus 1 in the second embodiment are similar to those in the first embodiment, so only the differences between the second embodiment and the first embodiment will be detailed below.

Specifically, before calculating the weighted luminance values of the reference frame 104, the electronic apparatus 1 will adjust at least a portion of the luminance values of the reference frame 104 that are greater than a predetermined threshold (i.e. the luminance values that are too bright) in this embodiment. For example, the predetermined threshold may be 120 when the range of the luminance values is from 0 to 255. It is noted that the exact value of the predetermined threshold is not used to limit the scope of the present invention. The requirement of adjusting at least a portion of the luminance values that are greater than the predetermined threshold lies in the fact that they will inadequately contribute to the weighted luminance value and cause a smaller second exposure setting. Hence, some of them have to be reduced in order to contribute less in the weighted luminance value.

The luminance values corresponding to the reference values 104 are derived by two alternative ways as described in the first embodiment, so the adjustment of the luminance values will be performed in two alternative ways as well. According to the first way, the luminance values corresponding to the reference frame 104 are the average luminance values of the blocks of the reference frame 104. In this situation, the processor 13 adjusts at least a portion of the average luminance values of the blocks that are greater than the predetermined threshold.

Particularly, the processor 13 deals with the reference frame 104 block by block. For each average luminance value that is greater than the predetermined threshold, the processor 13 calculates an accumulation number of the average luminance values that have been adjusted. If the accumulation number is smaller than a predetermined discard number, the processor 13 adjusts the average luminance value according to a reduction ratio. To be more specific, the configured setting 100 may further include a discard ratio (e.g. 60%) and a reduction ratio (e.g. 10%). The processor 13 may derive the predetermined discard number by multiplying the discard ratio and the block numbers of the reference frame 104. When the accumulation number is smaller than the predetermined discard number, the processor 13 multiplies the average luminance value by the reduction ratio. On the contrary, when the accumulation number is not smaller than the predetermined discard number, the processor 13 will no longer adjust that average luminance value.

According to the second way, the luminance values corresponding to the reference frame 104 are the pixel values of the reference frame 104. In this situation, the processor 13 adjusts at least a portion of the pixel values that are greater than the predetermined threshold. Similarly, the processor 13 deals with the reference frame 104 pixel by pixel. For each of the pixel values greater than the predetermined threshold, the processor 13 calculates an accumulation number of the pixel values that have been adjusted. When the accumulation number is smaller than the predetermined discard number, the processor 13 adjusts the pixel value according to the reduction ratio, such as multiplying the pixel value by the reduction ratio. On the contrary, when the accumulation number is not smaller than the predetermined discard number, the processor 13 will no longer adjust that pixel value. The predetermined discard number may also be derived by multiplying the discard ratio and the block numbers of the reference frame 104.

The above discard ratio as well as the predetermined discard number can be viewed as an indication of the intention of a user that uses the camera module 11 to capture the reference frame 104. When the accumulation number is not smaller than the predetermined discard number, it means that the user intends to capture a scene that is extremely bright. Under this situation, reducing all the luminance values that are greater than the predetermined threshold may be inadequate. Setting the discard ratio and/or the predetermined discard number can avoid the inadequate adjustment under the situation that the user intends to shoot an extremely bright scene.

After the luminance values have been adjusted, the processor 13 calculates the weighted luminance value of the reference frame 104 according to the adjusted luminance values, generates the comparison result by comparing the weighted luminance value and the luminance target of the HDR mode, and decides the second exposure setting according to the comparison result.

Similar the first embodiment, when the comparison result is the weighted luminance value being equal to the luminance target, the processor 13 decides the second exposure setting to be equal to the first exposure setting. It means that the exposure time and/or gain value of the first exposure setting is adequate and no further adjustment is required. When the comparison result is the weighted luminance value being greater than the luminance target, the processor 13 decides that the second exposure setting is smaller than the first exposure setting. When the comparison result is the weighted luminance value being smaller than the luminance target, the processor 13 decides that the second exposure setting is greater than the first exposure setting. Afterwards, the camera module 11 captures another frame 104 according to the second exposure setting. For the two situations that the weighted luminance value is not equal to the luminance target, the camera module 11 and the processor 13 repeat the aforementioned processes until the weighted luminance value is equal to the luminance target of the HDR mode.

From the above descriptions, the second embodiment will adjust at least a portion of the pixel values that are greater than the predetermined threshold before calculating the weighted luminance value. Hence, these luminance values will not inadequately contribute to the weighted luminance value and the decided second exposure setting for the next frame will be more accurate.

Figure 2:
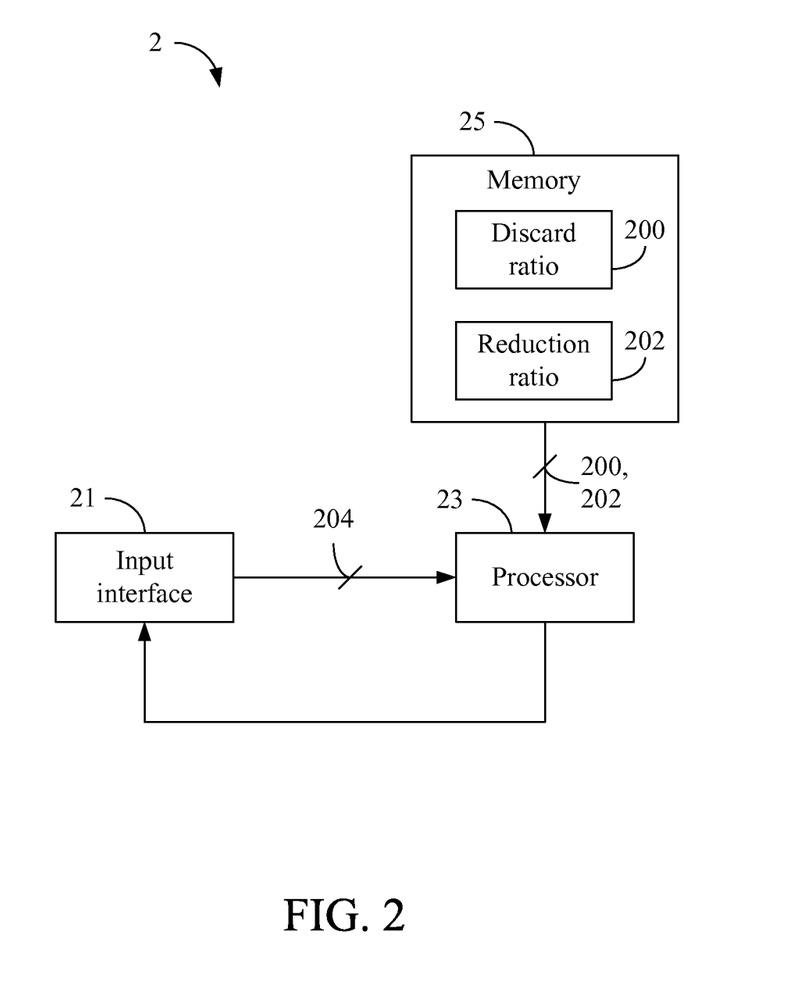
FIG. 2 illustrates a schematic view of an electronic apparatus 3 of the third embodiment of the present invention.

A third embodiment of the present invention is an electronic apparatus 2 and a schematic view of which is depicted in FIG. 2. The electronic apparatus 2 comprises an input interface 21, a processor 23, and a memory 15, wherein the processor 23 is electrically connected to the input interface 21 and the memory 25. The processor 23 may be any of various processors, central processing units (CPUs), microprocessors, or other computing devices that are well-known by those of ordinary skill in the art. The memory 25 may be any one of various built-in memories or other storage media that have the same function and can readily occur to those of ordinary skill in the art.

The input interface 21 receives a reference frame 204, wherein the reference frame 204 corresponds to a plurality of luminance values. In this embodiment, the luminance values corresponding to the reference frame 204 are derived from two alternative ways. According to the first way, the processor 23 divides the reference frame 204 into a plurality of blocks and calculates an average luminance value for each of the blocks, wherein each of the average luminance value is one of the aforementioned luminance values corresponding to the reference frame 204. According to the second way, the reference frame 204 has a plurality of pixels, each of the pixels has a pixel value, and each of the pixel values is one of the aforementioned luminance values corresponding to the reference frame 204.

In this embodiment, the processor 13 adjusts at least a portion of the luminance values that are greater than a predetermined threshold. Particularly, for each luminance value that is greater than the predetermined threshold, the processor 13 calculates an accumulation number of the luminance values that have been adjusted. For example, the processor 13 may retrieve the discard ratio 200 from the memory 25 and derives the predetermined discard number by multiplying the discard ratio 200 and the block numbers (or the pixel number) of the reference frame 204. The processor 13 may also retrieve the reduction ratio 202 from the memory 25. Next, the processor 13 adjusts the luminance value by the reduction ratio 202 when the accumulation number is smaller than the predetermined discard number. On the contrary, the processor 13 will no longer adjust the luminance value by the reduction ratio 202 when the accumulation number is not smaller than the predetermined discard number.

After the luminance values have been adjusted, the processor 13 calculates a weighted luminance value of the reference frame 204 according to the adjusted luminance values, e.g. by averaging the adjusted luminance values. Next, the processor 13 generates a comparison result by comparing the weighted luminance value and a luminance target, and decides the luminance values according to the comparison result.

When the comparison result is the weighted luminance value being equal to the luminance target, it means that the variance of the adjusted luminance values is proper. Hence, the processor 13 decides the adjusted luminance values are the final values for the reference frame 204 and will not adjust them anymore. When the comparison result is the weighted luminance value being not equal to the luminance target, the processor 13 will perform the aforementioned processes by changing the discard ratio 200 and/or reduction ratio 202.

According to the above descriptions, when a reference frame of low luminance variance is desired, it can be easily achieved by adjusting at least a portion of the luminance values of the reference frame that are greater than the predetermined threshold.

Figure 3:
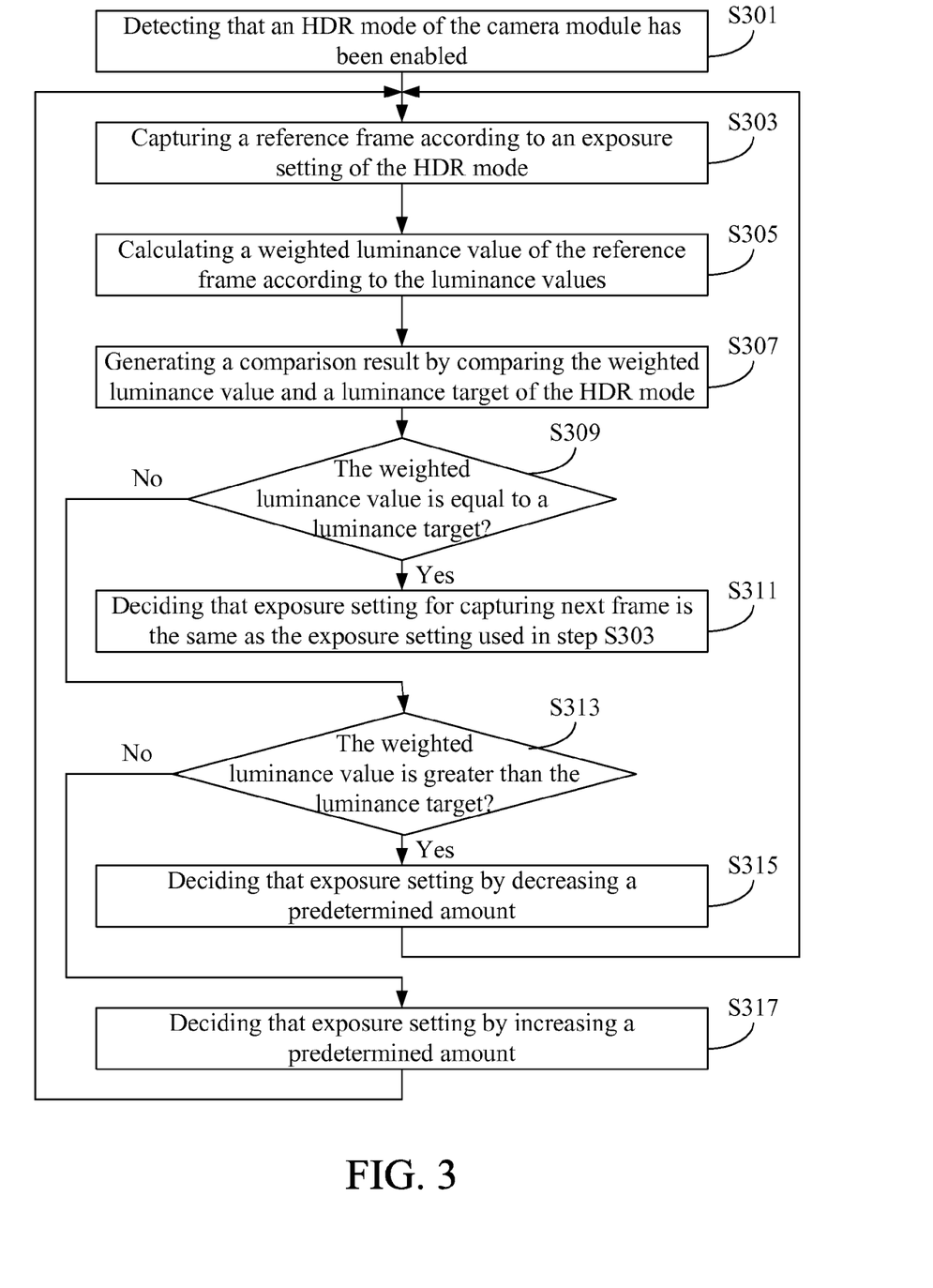
FIG. 3 illustrates a flowchart of an adjustment method of the fourth embodiment of the present invention.

A fourth embodiment of the present invention is an adjustment method for use in an electronic apparatus, such as the electronic apparatus 1. The electronic apparatus comprises a processor and a camera module. A flowchart of the adjustment method is illustrated in FIG. 3.

First, step S301 is executed by the processor for detecting that an HDR mode of the camera module has been enabled. Next, step S303 is executed by the camera module for capturing a reference frame according to an exposure setting, wherein the reference frame corresponds to a plurality of luminance values. The luminance values corresponding to the reference frame are derived from two alternative ways. According to the first way, a step is executed by the processor for dividing the reference frame into a plurality of blocks (not shown) and then another step is executed by the processor for calculating an average luminance value for each of the blocks (not shown), wherein each of the average luminance value is one of the luminance values of the reference frame. According to the second way, the reference frame has a plurality of pixels, each pixel has a pixel value, and each pixel value is one of the luminance values of the reference frame.

Following that, step S305 is executed by the processor for calculating a weighted luminance value of the reference frame according to the luminance values, e.g. by weighting the luminance values. Step S307 is then executed by the processor for generating a comparison result by comparing the weighted luminance value and a luminance target of the HDR mode.

Afterwards, step S309 is executed by the processor for determining whether the comparison result is the weighted luminance value equal to the luminance target of the HDR mode. If it is yes, step S311 is then executed by the processor for deciding that exposure setting for capturing next frame is the same as the exposure setting used in step S303. If the step S309 determines that the weighted luminance value is not equal to the luminance target of the HDR mode, step S313 is executed by the processor for determining whether the weighed luminance value is greater than the luminance target. If it is yes, then step S315 is executed by the processor for deciding the exposure setting by decreasing a predetermined amount. After step S315, the adjustment proceeds to step S303 again. If step S313 is no, then step S317 is executed by the processor for deciding the exposure setting by increasing a predetermined amount. After step S317, the adjustment proceeds to step S303 again.

In some other embodiments, an additional step (not shown) may be executed by the processor for adjusting at least a portion of the luminance values that are greater than a predetermined threshold before executing the step S305. Specifically, when the luminance values corresponding to the reference frame are the average luminance values for the blocks of the reference frame, the ones to be adjusted are some/all of the average luminance values that are greater than the predetermined threshold. Alternatively, when the luminance values corresponding to the reference frame are the pixel values of the reference frame, the ones to be adjusted are some/all of the pixel values that are greater than the predetermined threshold. In either case, the adjustment method executes a step by the processor for calculating an accumulation number of the average luminance values that have been adjusted and executes another step by the processor for adjusting the average luminance value according to a reduction ratio when the accumulation number is smaller than a predetermined discard number.

In addition to the aforesaid steps, the fourth embodiment can execute all the operations and functions set forth for electronic apparatus 1 in the first and second embodiments. How the fourth embodiment executes these operations and functions will be readily appreciated by those of ordinary skill in the art based on the explanations of the first and second embodiments, and thus will not be further described therein.

Figure 4:
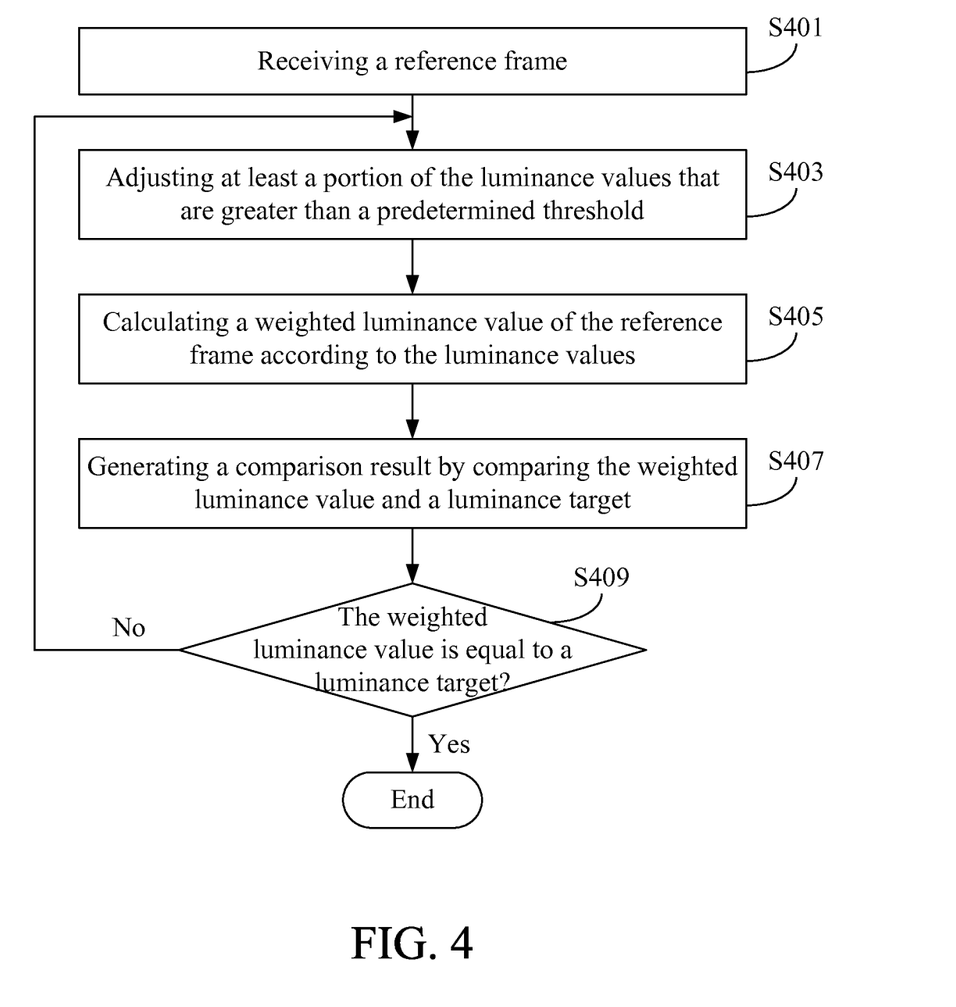
FIG. 4 illustrates a flowchart of an adjustment method of the fifth embodiment of the present invention.

A fifth embodiment of the present invention is an adjustment method for use in an electronic apparatus, such as the electronic apparatus 2. The adjustment method is for lowering luminance variance of a frame. The electronic apparatus comprises a processor and an input interface. A flowchart of the adjustment method is illustrated in FIG. 4.

First, step S401 is executed by the input interface for receiving a reference frame, wherein the reference frame corresponds to a plurality of luminance values. The luminance values corresponding to the reference frame are derived from two alternative ways. According to the first way, a step is executed by the processor for dividing the reference frame into a plurality of blocks (not shown) and then another step is executed by the processor for calculating an average luminance value for each of the blocks (not shown), wherein each of the average luminance value is one of the luminance values of the reference frame. According to the second way, the reference frame has a plurality of pixels, each pixel has a pixel value, and each pixel value is one of the luminance values of the reference frame.

Next, step S403 is executed by the processor for adjusting at least a portion of the luminance values that are greater than a predetermined threshold. Specifically, for each of the luminance values that is greater than the predetermined threshold, step S403 executes a step for calculating an accumulation number of the luminance values that have been adjusted and executes another step for adjusting the luminance value by a reduction ratio when the accumulation number is smaller than a predetermined discard number.

Afterwards, step S405 is executed by the processor for calculating a weighted luminance value of the reference frame according to the luminance values. Next, step S407 is executed by the processor for generating a comparison result by comparing the weighted luminance value and a luminance target. Following that, step S409 is executed by the processor for determining whether the weighted luminance value is equal to luminance target. If it is yes, the adjustment method then decides that the adjusted luminance values of the reference frame are adequate. Hence, the adjustment method finishes the procedure.

If the weighted luminance value is not equal to luminance target, the adjustment method then proceeds to step S403 for adjusting the luminance values of the reference frame again. In other embodiments, the adjustment method may further execute a step by the processor for adjusting the reduction ratio and/or the predetermined discard number before executing the step S403 again.

In addition to the aforesaid steps, the fifth embodiment can execute all the operations and functions set forth for electronic apparatus 3 in the third embodiment. How the fifth embodiment executes these operations and functions will be readily appreciated by those of ordinary skill in the art based on the explanations of the third embodiment, and thus will not be further described therein.

The adjustment methods of the fourth and fifth embodiments may be implemented by a computer program which is stored in a non-transitory tangible machine-readable medium. When the computer program is loaded into an electronic apparatus, a plurality of codes comprised in the computer program will be executed by the electronic apparatus to accomplish all the steps described in the fourth and fifth embodiments. This non-transitory tangible machine-readable medium may be a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the techniques disclosed by the present invention will adjust the exposure setting of a camera module in order to meet a luminance target when the HDR mode of the camera module is enabled. In order to derive a better exposure setting, at least a portion of the luminance values of a reference frame that are greater than a predetermined threshold will be adjusted. Hence, the frames captured according to the adjusted exposure setting and a subsequent HDR frame will contain more details. In addition, in case there is a need for a frame that is of low luminance variance, the techniques disclosed by the present invention are able to achieve that as well.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic apparatus, comprising:
   a camera module, being enabled into a High Dynamic Range (HDR) mode and configured to capture a first reference frame according to a first exposure setting, wherein the first reference frame corresponds to a plurality of first luminance values; and
   a processor, being electrically connected to the camera module and configured to divide the first reference frame into a plurality of blocks, calculate an average luminance value for each of the blocks, wherein each of the average luminance value is one of the first luminance values of the first reference frame,
   wherein the processor further adjusts at least a portion of the average luminance values that are greater than a predetermined threshold before calculating a first weighted luminance value, calculates the first weighted luminance value of the first reference frame by averaging the average luminance values of the blocks, generates a first comparison result by comparing the first weighted luminance value and a luminance target of the HDR mode, and decides a second exposure setting according to the comparison result.

2. The electronic apparatus of claim 1, wherein the processor adjusts at least a portion of the average luminance values that are greater than the predetermined threshold by performing the following operations for each average luminance value that is greater than the predetermined threshold:
   calculating an accumulation number of the average luminance values that have been adjusted; and
   adjusting the average luminance value according to a reduction ratio when the accumulation number is smaller than a predetermined discard number.

3. An electronic apparatus, comprising:
   a camera module, being enabled into a High Dynamic Range (HDR) mode and configured to capture a first reference frame according to a first exposure setting, wherein the first reference frame corresponds to a plurality of first luminance values, the first reference frame has a plurality of pixels, each pixel has a pixel value, each pixel value is one of the first luminance values of the first reference frame; and
   a processor, being electrically connected to the camera module and configured to adjust at least a portion of the pixel values that are greater than a predetermined threshold before calculating a first weighted luminance value, calculate the first weighted luminance value of the first reference frame according to the first luminance values, generate a first comparison result by comparing the first weighted luminance value and a luminance target of the HDR mode, and decide a second exposure setting according to the comparison result.

4. The electronic apparatus of claim 3, wherein the processor adjusts at least a portion of the pixel values that are greater than the predetermined threshold by performing the following operations for each of the pixel values that is greater than the predetermined threshold:
   calculating an accumulation number of the pixel values that have been adjusted; and
   adjusting the pixel value according to a reduction ratio when the accumulation number is smaller than a predetermined discard number.

5. An adjustment method for use in an electronic apparatus, the electronic apparatus comprising a processor and a camera module, the adjustment method comprising the following steps of:
   detecting that a High Dynamic Range (HDR) mode of the camera module has been enabled by the processor;
   capturing a reference frame according to an exposure setting by the camera module, wherein the reference frame corresponds to a plurality of luminance values;
   dividing the reference frame into a plurality of blocks by the processor;
   calculating an average luminance value for each of the blocks by the processor, wherein each of the average luminance value is one of the luminance values of the reference frame;
   adjusting at least a portion of the average luminance values that are greater than a predetermined threshold by the processor;
   calculating a weighted luminance value of the reference frame by averaging the average luminance values of the blocks by the processor;

generating a comparison result by comparing the weighted luminance value and a luminance target of the HDR mode by the processor; and deciding the exposure setting according to the comparison result by the processor.

6. The adjustment method of claim 5, wherein the step of adjusting at least a portion of the average luminance values that are greater than the predetermined threshold comprises the following step of:

performing the following steps for each average luminance value that is greater than the predetermined threshold:

calculating an accumulation number of the average luminance values that have been adjusted by the processor; and adjusting the average luminance value according to a reduction ratio by the processor when the accumulation number is smaller than a predetermined discard number.

7. An adjustment method for use in an electronic apparatus, the electronic apparatus comprising a processor and a camera module, the adjustment method comprising the following steps of:

detecting that a High Dynamic Range (HDR) mode of the camera module has been enabled by the processor;

capturing a reference frame according to an exposure setting by the camera module, the reference frame corresponding to a plurality of luminance values, wherein the reference frame has a plurality of pixels, each pixel has a pixel value, each pixel value is one of the luminance values of the reference frame;

adjusting at least a portion of the pixel values that are greater than a predetermined threshold by the processor;

calculating a weighted luminance value of the reference frame according to the luminance values by the processor;

generating a comparison result by comparing the weighted luminance value and a luminance target of the HDR mode by the processor; and deciding the exposure setting according to the comparison result by the processor.

8. The adjustment method of claim 7, wherein the step of adjusting at least a portion of the pixel values that are greater than the predetermined threshold comprises the following step of:

performing the following steps for each of the pixel values that is greater than the predetermined threshold:

calculating an accumulation number of the pixel values that have been adjusted by the processor; and adjusting the pixel value according to a reduction ratio by the processor when the accumulation number is smaller than a predetermined discard number.

* * * * *